(12) United States Patent
Saito et al.

(10) Patent No.: US 8,487,553 B2
(45) Date of Patent: Jul. 16, 2013

(54) LIGHTING DEVICE, LIGHTING CONTROL DEVICE, ILLUMINATION DEVICE, AND PROJECTOR

(75) Inventors: Osamu Saito, Matsumoto (JP); Masahide Tsuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 326 days.

(21) Appl. No.: 13/045,993

(22) Filed: Mar. 11, 2011

(65) Prior Publication Data

US 2011/0234997 A1 Sep. 29, 2011

(30) Foreign Application Priority Data

Mar. 24, 2010 (JP) .................................. 2010-068296

(51) Int. Cl.
*G05F 1/00* (2006.01)

(52) U.S. Cl.
USPC .............. 315/308; 315/209 CD; 315/209 SC; 315/291; 315/289; 315/246; 315/279

(58) Field of Classification Search
USPC .............. 315/209 R, 209 T, 209 CD, 209 SC, 315/225, 226, 246, 247, 289–291, 307, 308, 360, 276–279, DIG. 7; 353/85

See application file for complete search history.

(56) References Cited

U.S. PATENT DOCUMENTS

| 5,463,287 | A |  | 10/1995 | Kurihara et al. |
| 6,642,673 | B2 | * | 11/2003 | Hudson et al. ................ 315/290 |
| 6,756,744 | B2 | * | 6/2004 | Furukawa ..................... 315/224 |
| 7,365,497 | B2 | * | 4/2008 | Fukuda et al. ............. 315/209 T |
| 7,531,965 | B2 | * | 5/2009 | Okamoto et al. ......... 315/209 R |

* cited by examiner

*Primary Examiner* — Haiss Philogene (57) ABSTRACT

A lighting device which lights the discharge lamp, includes: a converting circuit which converts the direct current into an alternating current; a pulse generating circuit which generates a high voltage pulse; and a trigger circuit which causes the pulse generating circuit to generate the high voltage pulse, wherein the pulse generating circuit includes a primary winding and a secondary winding and generates the high voltage pulse by increasing a current input to the secondary winding based on a current input to the primary winding, and the trigger circuit includes a high pass filter; a first capacitor which stores and discharges charges input via the high pass filter; and a third switching element which outputs an output current from a second capacitor connected in parallel to the converting circuit to the primary winding if an output voltage from the first capacitor exceeds a threshold.

14 Claims, 5 Drawing Sheets

LIGHTING DEVICE, LIGHTING CONTROL DEVICE, ILLUMINATION DEVICE, AND PROJECTOR

BACKGROUND

1. Technical Field

The present invention relates to a lighting device which lights a discharge lamp, a lighting control device, an illumination device, and a projector.

2. Related Art

A projector including a light source, an optical modulator which modulates a flux of light emitted from the light source to form an image based on image information, and a projection optical device which projects the image has been known in the related art. In many cases, such a light source uses a discharge lamp such as an ultra high pressure mercury lamp in which a discharging space is formed with a pair of electrodes and discharging material sealed therein, where a lighting control device is employed to control lighting of the discharge lamp. A known example of such a lighting control device may include a lighting device which lights a discharge lamp by supplying lamp power to the discharge lamp, and a controller which controls driving of the lighting device (see U.S. Pat. No. 5,463,287).

The lighting control device disclosed in U.S. Pat. No. 5,463,287 includes a converting circuit which adjusts output current and output power, an inverter circuit which converts direct current (DC) into alternating current (AC), an igniter circuit, a transformer which includes a primary winding connected to the igniter circuit and a secondary winding connected to the inverter circuit, and a control circuit (microcomputer) which controls these circuits through a plurality of driving circuits. In such a lighting control device, when the control circuit outputs signals to the driving circuits, the igniter circuit supplies a high voltage ignition pulse to the primary winding of the transformer. Accordingly, a high voltage pulse generated in the secondary winding of the transformer is applied to the discharge lamp to start discharging of the discharge lamp.

However, in the lighting control device disclosed in U.S. Pat. No. 5,463,287, since the control circuit, the driving circuit, and the igniter circuit are connected by a control line, there is a possibility that a high voltage is applied to the control line, which may result in damage to the control circuit. Accordingly, there is a need to provide a measure against high voltages for the control circuit, which may lead to a complicated configuration of the lighting control device.

SUMMARY

An advantage of some aspects of the invention is to provide a lighting device which is capable of setting an application timing of a high voltage pulse with a simple configuration, a lighting control device, an illumination device, and a projector.

According to an aspect of the invention, there is provided a lighting device which supplies power to an electrode of a discharge lamp to light the discharge lamp, including: a converting circuit which includes a pair of first switching elements and a pair of second switching elements to which a direct current is input, and converts the direct current into an alternating current by switching between a state where one of the pair of first switching elements and the pair of second switching elements is turned on and a state where the other of the pair of first switching elements and the pair of second switching elements is turned off; a pulse generating circuit which generates a high voltage pulse from the alternating current input from the converting circuit and applies the generated high voltage pulse to the electrode; and a trigger circuit which causes the pulse generating circuit to generate the high voltage pulse, wherein the pulse generating circuit includes a primary winding connected to the trigger circuit and a secondary winding connected to the converting circuit and generates the high voltage pulse by increasing a current input to the secondary winding based on a current input to the primary winding, wherein the trigger circuit includes a high pass filter which is connected at a middle point between the first switching elements and the second switching elements, flows the alternating current if the alternating current having a frequency which is equal to or higher than a predetermined frequency is input from the converting circuit, and interrupts the alternating current if the alternating current having a frequency which is lower than the predetermined frequency is input from the converting circuit; a first capacitor which stores and discharges charges input via the high pass filter; and a third switching element which outputs an output current from a second capacitor connected in parallel to the converting circuit to the primary winding if an output voltage from the first capacitor exceeds a threshold.

Examples of the first switching elements and the second switching elements may include a transistor, a field effect transistor (FET) such as, for example, metal oxide semiconductor FET (MOSFET), or the like.

According to the aspect of the invention, by driving the converting circuit at the driving frequency which is equal to or higher than a frequency of an alternating current flowing into the high pass filter (hereinafter sometimes referred to as a "turned-on frequency"), charges are stored in the first capacitor, and the pulse generating circuit generates a high voltage pulse to be applied to the electrode if a voltage output from the first capacitor exceeds a threshold set in the third switching element.

Here, a period from the storage of charges in the first capacitor to the discharging of charges can be calculated by an integration value of an alternating current input to the first capacitor via the high pass filter and a capacitance and a charging constant of the first capacitor. Accordingly, it is possible to output a high voltage pulse at an arbitrary high voltage pulse output timing by driving the converting circuit at a high frequency at a timing proceeding the arbitrary high voltage pulse output timing by the period. Accordingly, it is possible to apply the high voltage pulse to the electrode of the discharge lamp at a desired timing.

If the converting circuit is driven at a driving frequency lower than the turned-on frequency, no high voltage pulse is generated since no charge is stored in the first capacitor. Accordingly, a case where the driving frequency of the converting circuit is set to a frequency exceeding the turned-on frequency to generate the high voltage pulse and a case where the driving frequency of the converting circuit is set to a frequency lower than the turned-on frequency to generate no high voltage pulse may be switched.

Accordingly, there is no need to connect the controller (a control circuit and a driving circuit) and an igniter circuit using a control line and to control an application timing of a high voltage pulse by the igniter circuit like the lighting control device disclosed in U.S. Pat. No. 5,463,287. Accordingly, a configuration of the lighting device for a high voltage-resistant measure of the controller can be simplified, thereby setting an application timing of the high voltage pulse with a simpler configuration.

In the lighting device, preferably, the third switching element includes: a DIAC connected to the first capacitor; and a thyristor which includes a gate connected to an output terminal of the DIAC, a cathode connected to the first capacitor, and an anode connected to the primary winding.

A DIAC is a device which is turned off if an input voltage is lower than a threshold and is quickly turned on if the input voltage is equal to or higher than the threshold. A thyristor is a device which is turned off between a cathode and an anode if a gate current is not input from a gate into the cathode and is turned on between the cathode and the anode if a gate current is input from the gate into the cathode.

According to the aspect of the invention, by configuring the third switching element with the DIAC and the thyristor, a current can be supplied from the second capacitor to the primary winding in fast response to discharging of charges of the first capacitor. Accordingly, it is possible to reduce a period from discharging of charges of the first capacitor to generation of the high voltage pulse and to reliably apply the high voltage pulse at the above-mentioned arbitrary timing.

According to another aspect of the invention, there is provided a lighting control device including: the above-described lighting device; and a controller which outputs a control signal to control the turned-on state and the turned-off state of the pair of first switching elements and the pair of second switching elements and drives the converting circuit based on the control signal.

According to the aspect of the invention, in addition to the advantages of the above-described lighting device, as the controller outputs the control signal, the turned-on state and the turned-off state of the first switching elements and the second switching elements can be reliably controlled, and further, the converting circuit can be driven at high and low frequencies. Accordingly, a case where the high voltage pulse is generated and applied and a case where no high voltage pulse is generated or applied can be appropriately controlled. In addition, it is possible to promote lighting of the discharge lamp by generating and applying the high voltage pulse more frequently or to prevent deterioration of circuit elements by generating and applying the high voltage pulse less frequently, which may result in a long lifespan of the lighting control device.

In the lighting control device, preferably, the controller switches a driving frequency of the converting circuit between a first frequency, which is equal to or higher than the predetermined frequency, and a second frequency, which is lower than the predetermined frequency, based on a timing at which the high voltage pulse is applied to the electrode by the pulse generating circuit.

According to the aspect of the invention, as the controller changes the driving frequency of the converting circuit to the first frequency which is equal to or higher than the predetermined frequency, that is, the turned-on frequency, charges passing through the high pass filter are stored in the first capacitor, and further, the high voltage pulse is applied to the electrode. On the other hand, as the controller changes the driving frequency of the converting circuit to the second frequency which is lower than the turned-on frequency, an alternating current output from the converting circuit cannot be flown into the high pass filter. In addition, as the controller switches between the driving of the converting circuit at the first frequency and the driving of the converting circuit at the second frequency based on the application timing of the high voltage pulse, the high voltage pulse can be applied to the electrode at an arbitrary timing.

Since such switching of the driving frequency of the converting circuit (switching between the first frequency and the second frequency) by the controller can be made by changing a frequency at which the gate voltage is applied to the first switching elements and the second switching elements, the controller can be relatively simply configured, thereby setting an application timing of the high voltage pulse reliably with a simpler configuration.

According to still another aspect of the invention, there is provided an illumination device including: the above-described lighting control device; and a discharge lamp which has an electrode and is lit by power supplied by the lighting control device.

The illumination device has the same advantages as those of the above-described lighting control device. In addition, as described above, the high voltage pulse can be prevented from being unnecessarily applied to the electrode, which may result in a long lifespan of the discharge lamp, and further, of the illumination device.

According to yet another aspect of the invention, there is provided a projector including: the above-described illumination device; an optical modulation device which modulates a flux of light emitted from the illumination device; and a projection optical device which projects the modulated flux of light.

The projector has the same advantages as those of the above-described illumination device. Further, maintenance of the projector, such as exchange of the discharge lamp, can be simplified.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, one embodiment of the invention will be described with reference to the drawings.

Figure 1:
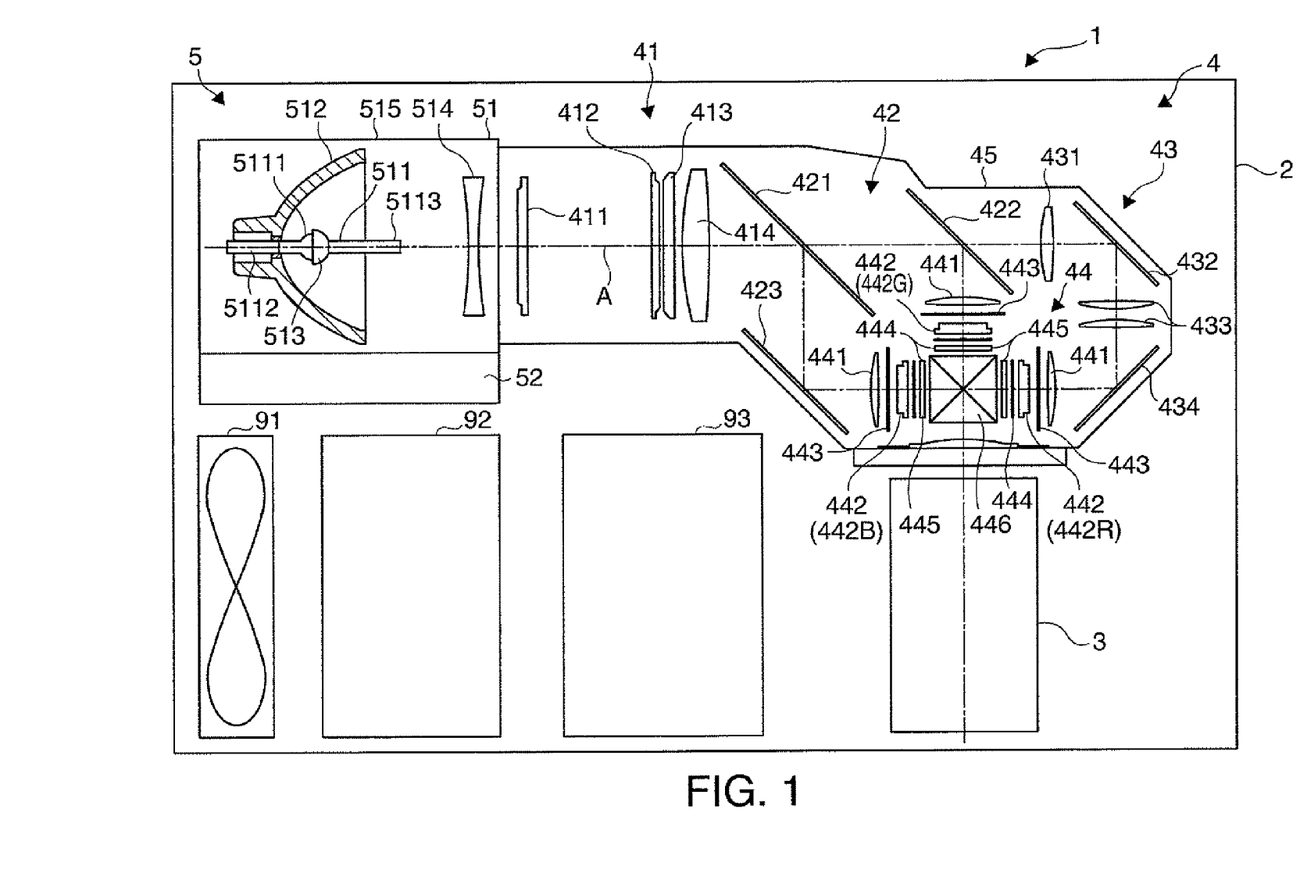
FIG. 1 is a schematic view showing a configuration of a projector according to one embodiment of the invention.

FIG. 1 is a schematic view showing a configuration of a projector 1 according to one embodiment of the invention.

The projector 1 serves to modulate a flux of light emitted from an internal light source, form an image based on image information, and projects the image in an enlarged manner onto a projection-targeted plane such as a screen or the like. As shown in FIG. 1, the projector 1 includes an exterior housing 2, a projection optical device 3, and an image forming apparatus 4. In addition, the projector 1 further includes a cooling unit including a cooling fan which cools the interior of the projector 1, and the like, a power supply unit 92 which supplies direct current into which commercial alternating current is converted to various internal componential members, a control unit 93 which controls the entire operation of the projector 1, and the like.

Configuration of Exterior Housing and Projection Optical Device

The exterior housing 2, which is made of synthetic resin or metal and has an approximately rectangular shape, accommodates the above-mentioned apparatuses 3 and 4 and units 91 to 93, and the like.

The projection optical device 3 focuses, enlarges, and projects the image formed by the image forming apparatus 4, which will be described later, onto the projection-targeted plane. Although not shown, the projection optical device 3 is configured by a set of lenses including a plurality of lenses accommodated in a tubular lens barrel.

Configuration of Image Forming Apparatus

The image forming apparatus 4 is an optical system which forms an image based on image information under the control of the above-mentioned control unit 93. The image forming apparatus 4 includes an illumination device 5, an illumination optical device 41, a color separation optical device 42, a relay optical device 43, an electric-optic device 44, and an optical component housing 45 which accommodates and arranges these devices at respective predetermined positions on an illumination optical axis A set therein and supports the projection optical device 3.

The illumination device 5 emits a flux of light, a detailed configuration of which will be described later.

The illumination optical device 41 includes a pair of lens arrays 411 and 412, a polarization conversion element 413, and a superimposing lens 414.

The color separation optical device 42 includes dichroic mirrors 421 and 422 and a reflective mirror 423, and the relay optical device 43 includes an incidence side lens 431, a relay lens 433, and reflective mirrors 432 and 434.

The electric-optic device 44 includes a field lens 441, three liquid crystal panels 442 as optical modulation devices (liquid crystal panels for red light, green light, and blue light are denoted by reference numerals 442R, 442G, and 442B, respectively), three corresponding incidence side polarizing plates 443, three corresponding viewing angle compensating plates 444, three corresponding emission side polarizing plates 445, and a cross dichroic prism 446 as a color combination optical device.

In the image forming apparatus 4 as configured above, a luminous intensity in an illuminated area of a flux of light emitted from the illumination device 5 (a light source unit 51) is substantially equalized by the illumination optical device 41 and the flux of light is separated into three color lights of red (R), green (G), and blue (B) by the color separation optical device 42. These separated color lights are modulated based on image information in the respective liquid crystal panels 442 to thereby form images for the color lights. Then, the images for the color lights are combined in the cross dichroic prism 446 and then are enlarged and projected on the projection-targeted plane by the projection optical device 3.

Configuration of Illumination Device

The illumination device 5 includes a light source unit 51 including a discharge lamp 511 as a light source, a primary reflective mirror 512, a secondary reflective mirror 513, a collimating lens 514, and a housing 515 accommodating these components, and a lighting control device 52 which controls the lighting of the discharge lamp 511.

Among these components, the discharge lamp 511 includes an approximately spherical light emitting portion 5111 in which a discharging space sealed with a pair of electrodes E (E1, E2) (see FIG. 2) and discharging material is formed, and a pair of sealing portions 5112 and 5113 which extend to far away from both ends of the light emitting portion 5111. An example of the discharge lamp 511 may include an ultra high pressure mercury lamp or the like.

The primary reflective mirror 512 is adhered to the sealing portion 5112 farther away from the lens array 411 by means of an adhesive. A concave curve reflective surface is formed on the inner side of the primary reflective mirror 512, by which light incident from the light emitting portion 5111 is reflected to be converged on a second focus on the illumination optical axis A.

The secondary reflective mirror 513 is a glass mold to cover a side of the sealing portion 5113 (a side opposite to the primary reflective mirror 512) in the light emitting portion 5111. The secondary reflective mirror 513 has a shape conforming to an external form of the light emitting portion 5111 and the surface thereof facing the light emitting portion 5111 has a reflective surface. The reflective surface of the secondary reflective mirror 513 reflects light, which is emitted to a side opposing the primary reflective mirror 512, of the light emitted from the light emitting portion 5111 to be incident onto the reflective surface of the primary reflective mirror 512. Accordingly, the light can be directly emitted from the light emitting portion 5111 to a leading end in an emission direction of the flux of light of the light source unit 51, while preventing the generation of light which is not incident into the lens array 411.

The collimating lens 514 collimates the flux of light reflected and converged by the primary reflective mirror 512 to the illumination optical axis A.

Configuration of Lighting Control Device

Figure 2:
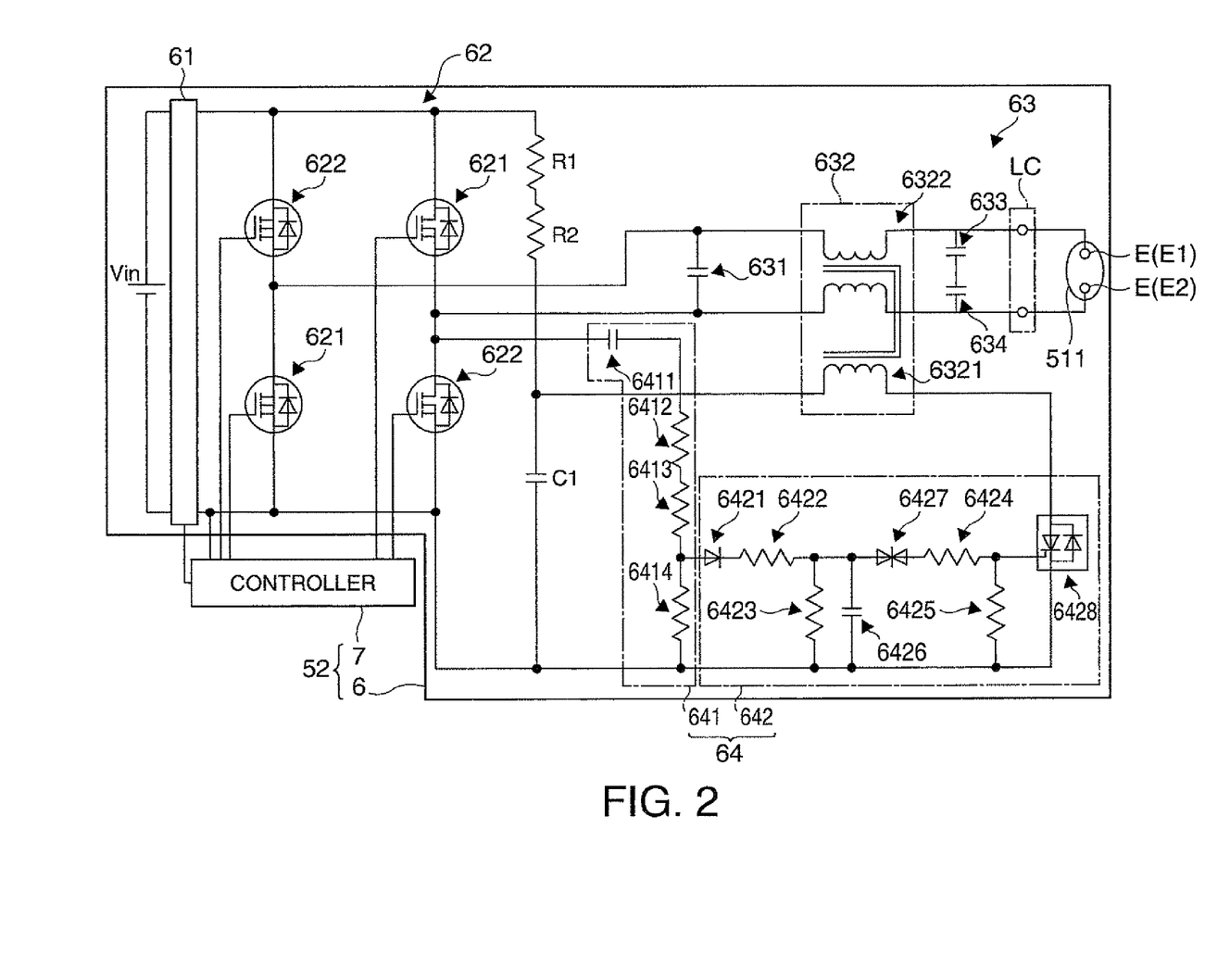
FIG. 2 is a view showing a configuration of a lighting control device according to the embodiment.

FIG. 2 is a view showing a configuration of the lighting control device 52.

As shown in FIG. 2, the lighting control device includes a lighting device 6 which converts direct current supplied from the above-mentioned power supply unit 92 into alternating current, outputs the alternating current to the electrodes E (E1 and E2) of the discharge lamp 511, and lights the discharge lamp 511, and a controller 7 which controls the lighting device 6 under the control of the above-mentioned control unit 93.

Configuration of Lighting Device

The lighting device 6 includes a voltage dropping circuit 61, a converting circuit 62, a pulse generating circuit 63, a trigger circuit 64, resistors R1 and R2, and a capacitor C1.

Configuration of Voltage Dropping Circuit

The voltage dropping circuit 61 is a down chopper circuit, and a circuit which drops a DC voltage of about 380 V input from a DC power source Vin connected to the power supply unit 92 to a voltage appropriate for lighting of the discharge lamp 511 (for example, about 50 V to about 150 V) under the control of the controller 7. Although not shown, the voltage dropping circuit 61 includes, for example, an FET (Field Effect Transistor) as a switching element and an inductor which are connected in series, and a diode and a capacitor which are branched from these elements and connected to each other. Among these, the FET controls direct current input to the discharge lamp based on a gate voltage applied by the controller 7 so that power supplied to the discharge lamp can be kept constant. The inductor, the diode, and the capacitor are used to remove a high frequency component of the input direct current, rectify the direct current, and make the power constant. The controller 7, which will be described in more detail later, controls the gate voltage depending on a lighting state of the lamp so that the voltage dropping circuit 61 can output a lamp voltage upon lighting of the discharge lamp 511.

An output terminal of the voltage dropping circuit 61 is connected to the controller 7, which then detects values of a current and a voltage input from the voltage dropping circuit 61 to the converting circuit 62.

Configuration of Converting Circuit

The converting circuit 62 is an inverter circuit which converts input direct current into alternating current. The converting circuit 62 is configured as a bridge circuit including a pair of N channel MOSFETs (Metal-Oxide-Semiconductor FETs: insulating gate type FETs) 621 and a pair of N channel MOSFETs 622. The direct current rectified through the voltage dropping circuit 61 is input to the bridge circuit. When the controller 7 applies the gate voltage, as a control signal, to the MOSFETs 621 and the MOSFETs 622, a current flows through a path including the pair of MOSFETs 621 and a path including the pair of MOSFETs 622 as these paths are alternately short-circuited, thereby producing an alternating current. In addition, the MOSFETs 621 and 622 respectively have diodes to prevent a current from flowing from the respective drains to sources thereof.

The converting circuit 62 is driven at a higher frequency (for example, 50 kHz) for a predetermined period of time T (which will be described later) before a timing at which a high voltage pulse to light the discharge lamp 511 is applied to the electrodes E by the pulse generating circuit 63, and then is driven at a lower frequency (for example, 500 Hz) for a predetermined period of time after the higher frequency driving period of time. When the discharge lamp 511 is lit, the converting circuit 62 is again driven at a lower frequency (for example, 200 Hz).

Such driving of the converting circuit 62 will be described in more detail later.

The resistors R1 and R2 and the capacitor C1 are connected with a source of one of the pair of MOSFETs 621 and a drain of the other and are connected with a source of one of the pair of MOSFETs 622 and a drain of the other. Among these, in the capacitor C1 are stored charges which are supplied to and transformed by a primary winding 6321 of a transformer 632 constituting the pulse generating circuit 63, which will be described below, and then supplied to a secondary winding 6322.

Configuration of Pulse Generating Circuit

The pulse generating circuit 63 is an igniter circuit which is operated at the same time when the discharge lamp 511 is lit. More specifically, the pulse generating circuit 63 is a circuit which outputs a high voltage pulse to the electrodes E through a lamp connector LC to perform dielectric breakdown between the electrodes E and trigger lighting of the discharge lamp 511. The pulse generating circuit 63 is connected in parallel to the discharge lamp 511 between the voltage dropping circuit 61 and the converting circuit 62 and the discharge lamp 511 (the electrodes E1 and E2).

The pulse generating circuit 63 includes a capacitor 631 as a coupling capacitor, an igniter transformer (hereinafter sometimes abbreviated as a "transformer") 632 having a primary winding 6321 and a secondary winding 6322, and capacitors 633 and 634.

Among these, the capacitors 633 and 634 are connected in series and are connected in parallel to the electrodes E with respect to the secondary winding 6322. These capacitors 633 and 634, along with the secondary winding 6322, cause a free vibration (overshooting) in a conducting alternating current according to the switching of the MOSFETs 621 and 622 of the converting circuit 62, thereby applying a medium vibrating voltage of about 1 kV. An output terminal of these capacitors 633 and 634 and the secondary winding 6322 is connected to the electrodes E of the discharge lamp 511 through the lamp connector LC.

In addition, the use of the two capacitors 633 and 634 can provide a high voltage-resistant property and allows an alternating current to be boosted by one of the capacitors even if the other fails.

As described above, the transformer 632 includes the primary winding 6321 and the secondary winding 6322. Among these, the primary winding 6321 has one end connected between the resistor R2 and the capacitor C1 and the other end connected to the trigger circuit 64 which will be described later. In addition, the secondary winding 6322 has one end connected between sources and drains of the MOSFETs 621 and 622 (that is, to nodes between the sources and the drains) and the other end connected to the lamp connector LC.

The transformer 632 transforms a current flowing into the secondary winding 6322 based on a current flowing into the primary winding 6321. Accordingly, when a current flows from the capacitor C1 into the primary winding 6321, a high voltage pulse is generated in the secondary winding 6322. The generated high voltage pulse is boosted by the capacitors 633 and 634 and then is applied to the electrodes E. Accordingly, insulation between the electrodes E1 and E2 is broken down to secure electrical conduction between the electrodes E1 and E2 to light the discharge lamp 511.

Thus, when the discharge lamp 511 is lit, the discharge lamp 511 operates with a constant voltage load (about 70 V) and the controller 7 controls the lighting of the discharge lamp 511 with constant power based on the detected output voltage and output current of the voltage dropping circuit 61.

Configuration of Trigger Circuit

The trigger circuit 64 serves to output a current to a thyristor 6428 at a timing depending on a change in a driving frequency of the converting circuit to thereby generate a high voltage pulse in the secondary winding 6322. In other words, the trigger circuit 64 is used to control a timing that the high voltage pulse is applied to the electrodes E by means of the pulse generating circuit 63. The trigger circuit 64 is connected in parallel to the pulse generating circuit 63 with respect to the converting circuit 62.

The trigger circuit 64 includes a high pass filter 641 and a current output portion 642.

The high pass filter 641 applies an alternating current to the current output portion 642 if a frequency of an alternating current input from the converting circuit 62 exceeds a preset frequency (hereinafter sometimes referred to as a "turned-on frequency"). The high pass filter 641 includes one capacitor 6411 and three resistors 6412 to 6414. In this embodiment, a turned-on frequency of the high pass filter 641 is set to 20 kHz or above.

The high pass filter 641 has one end connected between a source of one MOSFET 621 and a drain of another MOSFET 622 (that is, to a node between the source and the drain) and the other end connected to a source of the one MOSFET 622 and a source of the other MOSFET 621. This is because outputting a high voltage pulse to a positive polarity side of the electrodes E is considered to provide a higher lighting probability of the discharge lamp 511 and the high pass filter 641 is preferably arranged at the same side as a line of the pulse generating circuit 63 connected to the positive polarity side.

However, the high pass filter 641 may be connected between a drain of the other MOSFET 621 and the source of the other MOSFET 622 and a node therebetween may be a different portion if a change in the driving frequency of the converting circuit 62 can be detected.

The current output portion 642 accumulates charges of an alternating current flowing into the high pass filter 641 and outputs a current according to the accumulated charges to the thyristor 6428. The current output portion 642 includes a diode 6421, resistors 6422 to 6425, a capacitor 6426, a DIAC 6427, and the thyristor 6428.

Among these, the capacitor 6426, along with the resistor 6423, is connected in parallel to the diode 6421 and the resistor 6422 and stores the charges of the alternating current input from the high pass filter 641 via the diode 6421 and the resistor 6422. The charges stored in the capacitor 6426 are charges to be supplied to the thyristor 6428 and, if the charges exceed a predetermined capacitance, the capacitor 6426 discharges the charges.

In this embodiment, the DIAC 6427 and the thyristor 6428 constitute a third switching element, and if a voltage input from the capacitor 6426 exceeds a threshold, a current is supplied to the thyristor 6428.

Among these, an output terminal of the DIAC 6427 is connected to a gate of the thyristor 6428 via the resistor 6424. If the input voltage exceeds a threshold set in the DIAC 6427, the DIAC 6427 allows the current from the capacitor 6426 to conduct and to be supplied, as a gate current, to the thyristor 6428.

The thyristor 6428 includes a gate, a cathode, and an anode and a current is applied between the cathode and the anode when the gate current is supplied from the gate to the cathode. The cathode is connected in parallel to the resistor 6425 with respect to the DIAC 6427 and the resistor 6424 and the anode is connected to the primary winding 6321. In addition, a diode is connected to the cathode and the anode of the thyristor 6428 in order to prevent a current from flowing from the anode to the cathode.

Application Timing of High Voltage Pulse

Figure 3A:
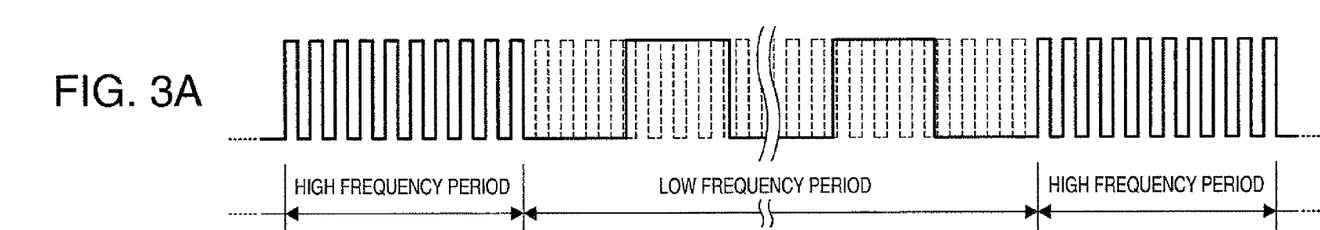
FIGS. 3A to 3C are diagrams showing waveforms of output currents from a converting circuit, a capacitor, and a pulse generating circuit according to the embodiment.
Figure 3B:
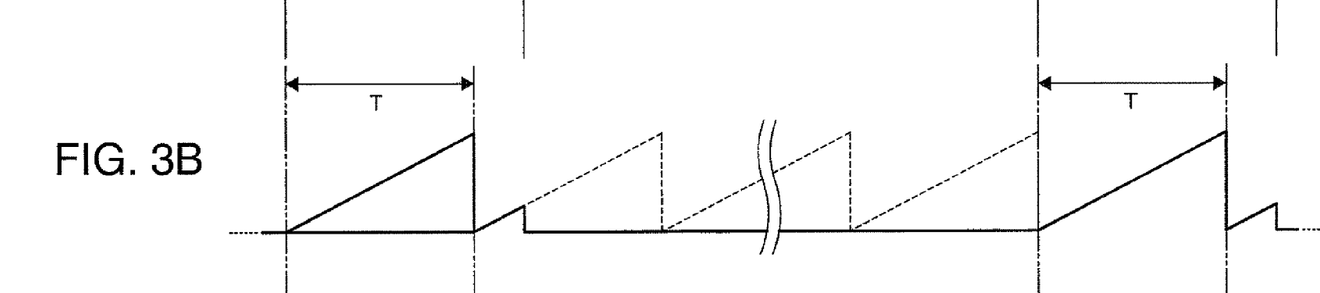
Figure 3C:
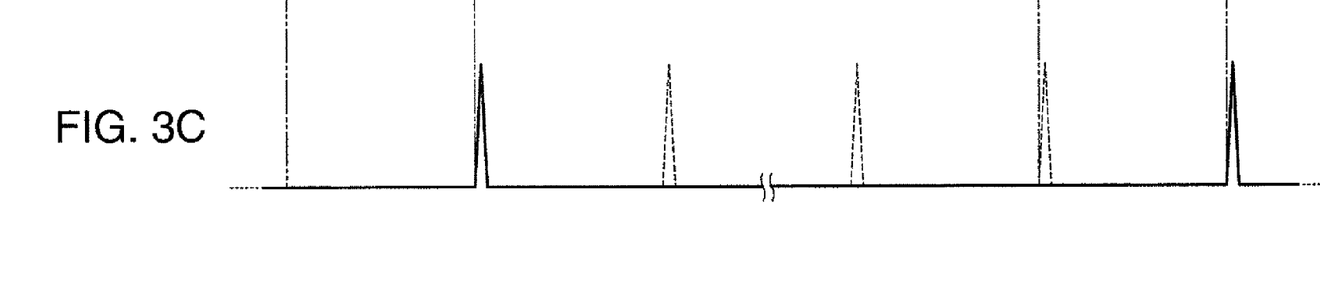

FIGS. 3A to 3C are diagrams showing waveforms of output currents from the converting circuit 62, the capacitor 6426, and the secondary winding 6322. In more detail, FIG. 3A shows a waveform of an alternating current output from the converting circuit 62, FIG. 3B shows an amount of charge stored in the capacitor 6426, and FIG. 3C shows a waveform of a high voltage pulse output from the secondary winding 6322. In FIGS. 3A to 3C, a waveform of a current when the driving frequency of the converting circuit 62 is maintained as a high frequency (that the converting circuit 62 is continuously driven at a high frequency) is indicated by a dashed line.

Here, high frequency and low frequency driving of the converting circuit 62 and generation of a high voltage pulse will be described.

When the converting circuit 62 is driven at a high frequency, a high frequency alternating current is generated by the converting circuit 62, as shown in a "high frequency period" in FIG. 3A. Since this alternating current has a frequency higher than a turned-on frequency and turns the high pass filter 641 on, charges are stored in the capacitor 6426 in this period, as shown in FIG. 3B. When an amount of charge stored in the capacitor 6426 exceeds a capacitance, charges are discharged from the capacitor 6426. If a voltage input to the DIAC 6427 by this discharging of charges exceeds a threshold, the DIAC 6427 is turned on to supply a gate current to the thyristor 6428. This gate current turns the thyristor 6428 on and accordingly a current is flown from the capacitor C1 to the primary winding 6321.

When the current is input to the primary winding 6321, a current to turn the secondary winding 6322 on is increased to generate a high voltage pulse, as shown in FIG. 3C. This high voltage pulse is applied to the electrodes E via the lamp connector LC.

On the other hand, when the converting circuit is driven at a low frequency, a low frequency alternating current is generated in the converting circuit 62, as shown in a "low frequency period" in FIG. 3A. Since this alternating current has a frequency lower than the turned-on frequency and does not turn the high pass filter 641 on, no charge is stored in the capacitor. 6426 in this period, as shown in FIG. 3B. Accordingly, the DIAC 6427 and the thyristor 6428 are turned off (off state) to supply no current from the capacitor C1 to the primary winding 6321, thereby generating no high voltage pulse.

In addition, if no low frequency period is present upon lighting the discharge lamp 511 (in other words, if the converting circuit 62 continues to be driven at the high frequency), the high frequency alternating current generated in the converting circuit continues to be input to the capacitor 6426, as indicated by dashed lines in FIGS. 3A to 3C. Accordingly, the capacitor 6426 discharges charges whenever the stored amount of charges exceeds the capacitance, thereby turning the thyristor 6428 on to continuously output the high voltage pulse. Since this high voltage pulse has a very high voltage, if it is unnecessarily continuously generated and output, a circuit configuration and the electrodes E of the lighting device may be deteriorated.

In contrast, a period during which no high voltage pulse is generated by driving the converting circuit 62 at the low frequency may be provided in the lighting device 6. Accordingly, upon lighting the discharge lamp 511, a case where the converting circuit 62 is driven at the high frequency to generate and apply the high voltage pulse and a case where the converting circuit 62 is driven at the low frequency to generate and apply no high voltage pulse may be switched.

In addition, since noise accompanying the generation of the high voltage pulse does not occur in the low frequency period of the converting circuit 62, it is possible to reliably obtain correct information by obtaining information related to a driving state of the lighting device 6 (for example, the output current and the output voltage of the voltage dropping circuit 61) in this period.

In addition, in this low frequency period, charges supplied to the secondary winding 6322 via the primary winding 6321 can be stored in the capacitor C1.

In addition, by providing the low frequency period, a period to converge a free vibration which is generated by the secondary winding 6322 and the capacitors 633 and 634 can be provided and the thyristor 6428 can be reliably turned off (off state). This can prevent a high voltage generated in the secondary winding 6322 from having an adverse effect on circuit elements of the trigger circuit 64 via the primary winding 6321 and the thyristor 6428. Accordingly, it is preferable that the driving frequency of the converting circuit 62 in the low frequency period is a period sufficient to turn the thyristor 6428 completely off (off state).

In addition, a period T from the start of charging of the capacitor 6426 to the discharging of charges can be calculated by an integration value of alternating current input via the high pass filter 641 and a capacitance and a charging constant of the capacitor 6426. Accordingly, it is possible to apply a high voltage pulse to the electrodes E at a predetermined pulse output timing (an arbitrary pulse output timing) by switching the driving frequency of the converting circuit above the turned-on frequency at a timing preceding the predetermined pulse output timing by the period T.

Configuration of Controller

Figure 4:
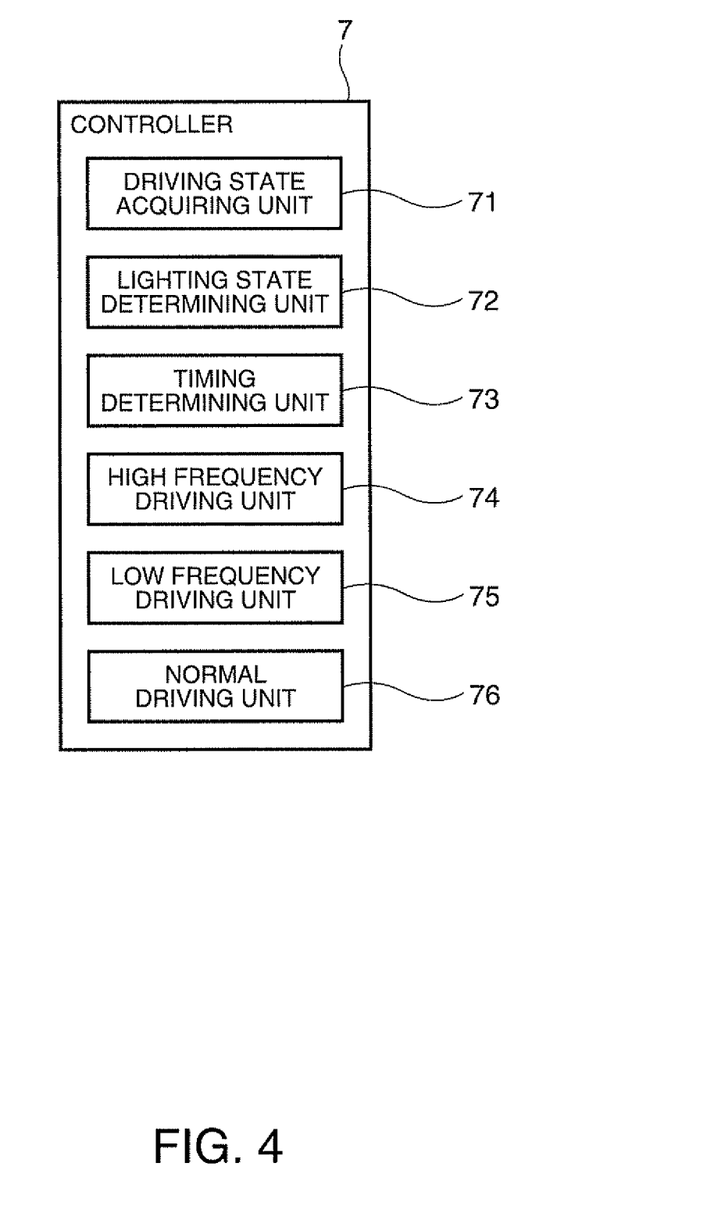
FIG. 4 is a block diagram showing a function and a configuration of a controller according to the embodiment.

FIG. 4 is a block diagram showing a function and a configuration of the controller 7.

As described above, the controller 7 controls the driving of the lighting device 6 and further controls the lighting of the discharge lamp 511. More specifically, the controller 7 determines a lighting state of the discharge lamp 511 based on a voltage and a current input from the voltage dropping circuit 61 and drives the lighting device 6 by applying the gate voltage to the converting circuit 62 based on the lighting state.

As shown in FIG. 4, the controller 7 includes a driving state acquiring unit 71, a lighting state determining unit 72, a timing determining unit 73, a high frequency driving unit 74, a low frequency driving unit 75, and a normal driving unit 76.

The driving state acquiring unit 71 acquires a current value and a voltage value of an output current from the voltage dropping circuit 61, as information indicating the driving state of the lighting device 6 (driving state information).

The lighting state determining unit 72 determines whether or not the discharge lamp 511 is lit, based on the values acquired by the driving state acquiring unit 71.

If the lighting state determining unit 72 determines that the discharge lamp 511 is not lit, the timing determining unit 73 determines whether or not a timing at which the converting circuit 62 is driven at a high frequency (a high frequency driving timing) arrives. This high frequency driving timing is a timing preceding the predetermined pulse output timing by the above-mentioned period T.

If the timing determining unit 73 determines that the high frequency driving timing arrives, the high frequency driving unit 74 drives the converting circuit 62 at a high frequency by applying the gate voltage, as a control signal, to the MOS-FETs 621 and 622 of the converting circuit 62. In this case, as described above, a driving frequency (corresponding to a first frequency in the invention) of the converting circuit 62 is set to a frequency exceeding the turned-on frequency of the high pass filter 641. In this embodiment, this driving frequency is set to 50 kHz.

If the timing determining unit 73 determines that the high frequency driving timing does not arrive, similarly, the low frequency driving unit 75 drives the converting circuit 62 at a low frequency by applying the gate voltage, as a control signal. In this case, a driving frequency (corresponding to a second frequency in the invention) of the converting circuit 62 is set to a frequency lower than the turned-on frequency of the high pass filter 641. In this embodiment, this driving frequency is set to 500 Hz.

If the lighting state determining unit 72 determines that the discharge lamp 511 is lit, similarly, the normal driving unit 76 drives the converting circuit at a low frequency by applying the gate. In this case, a driving frequency of the converting circuit 62 is set to 200 Hz in this embodiment.

In addition, in a state where the discharge lamp 511 is lit (a normal lighting state), the pulse generating circuit 63 is stopped to prevent a high voltage pulse from being applied to the electrodes E.

Lighting Control Process

Figure 5:
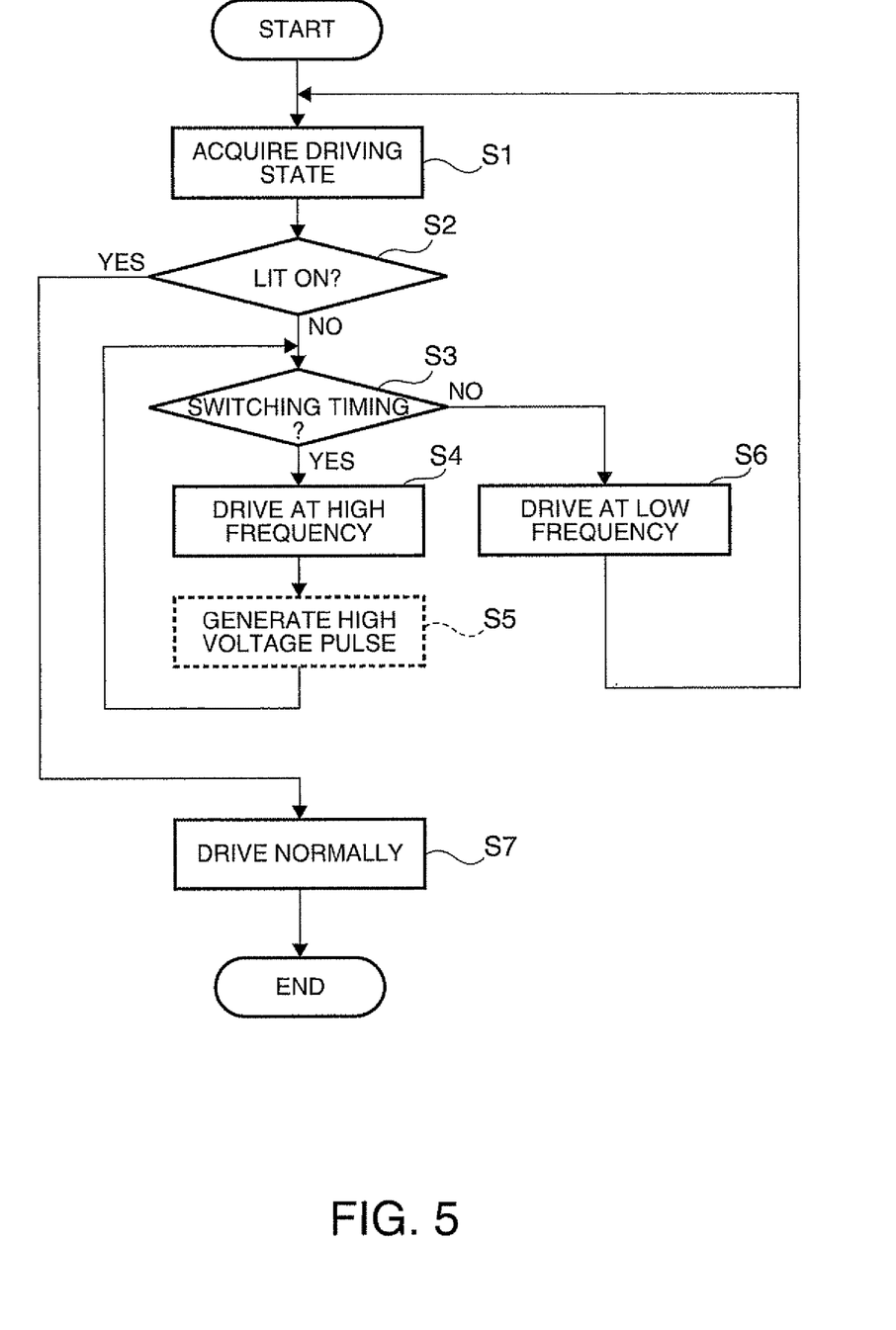
FIG. 5 is a flow chart showing a discharge lamp lighting control process performed by a lighting control device according to the embodiment.

FIG. 5 is a flow chart showing a lighting control process of the discharge lamp 511, which is performed by the lighting control device 52.

Upon receiving a control signal to light the discharge lamp 511 from the above-mentioned control unit 93, the lighting control device 52 performs the following lighting control process. This lighting control process is performed by a lighting control program stored in a memory (not shown).

In the lighting control process, as shown in FIG. 5, first, the driving state acquiring unit 71 of the controller 7 acquires the above-mentioned driving state information (Step S1).

Thereafter, the lighting state determining unit determines whether or not the discharge lamp 511 is lit, based on the driving state information (Step S2). If the lighting state determining unit 72 determines that the discharge lamp 511 is not lit, the timing determining unit 73 determines whether or not the above-mentioned high frequency driving timing arrives (Step S3).

If the timing determining unit 73 determines in a determination in Step S3 that the high frequency driving timing arrives, the high frequency driving unit 74 drives the converting circuit 62 at the high frequency (Step S4). Accordingly, a high frequency alternating current is output from the converting circuit 62, thereby turning the high pass filter 641 of the trigger circuit on, and accordingly, charges are stored in the capacitor 6426.

In addition, as described above, at a timing at which the stored charges exceeds the capacitance of the capacitor 6426 and an input voltage from the capacitor 6426 exceeds a threshold of the DIAC 6427, a gate current is output to the thyristor 6428 via the DIAC 6427. Accordingly, the thyristor 6428 is turned on and an output current from the capacitor C1 is supplied to the primary winding 6321, thereby applying a high voltage pulse from the secondary winding 6322 to the electrodes E (Step S5).

Thereafter, the lighting control device 52 returns to Step S3 where the timing determining unit 73 again determines whether or not the high frequency driving timing arrives.

On the other hand, in a determination in Step S3 if the timing determining unit 73 determines that the high frequency driving timing does not arrive, the low frequency driving unit 75 drives the converting circuit at the low frequency (Step S6). Accordingly, a low frequency alternating current output from the converting circuit 62 does not turn the high pass filter 641 on, and charge storage in the capacitor 6426 and conduction of current in the thyristor 6428 are stopped. Accordingly, an alternating current increased by a free vibration generated by the capacitors 633 and 634 is prevented from flowing backward into the thyristor 6428 via the primary winding 6321, thereby protecting the trigger circuit 64.

In addition, since no current is supplied to the primary winding 6321 when the converting circuit 62 is driven at the low frequency, noise accompanying the generation of the high voltage pulse in the pulse generating circuit 63 does not occur, as described above. Accordingly, when the converting circuit 62 is driven at the low frequency, the controller 7 returns to Step S1 where the driving state acquiring unit 71 acquires the above-mentioned driving state information. Accordingly, driving state information that is not affected by noise can be reliably acquired.

On the other hand, in a determination in Step S2, if the lighting state determining unit 72 determines that the discharge lamp 511 is lit, the normal driving unit 76 drives the converting circuit 62 at a frequency lower than the frequency in the low frequency driving and drives the lighting device 6 normally (Step S7). Accordingly, the discharge lamp 511 reaches the normal lighting state. Then, the lighting control process is ended.

The projector 1 according to the above-described embodiment has the following advantages.

In the lighting device 6, charges are stored in the capacitor 6426 by driving the converting circuit 62 at a driving frequency exceeding the turned-on frequency. These charges are discharged if they exceed the capacitance of the capacitor 6426, thereby turning the thyristor 6428 on, and the output current from the capacitor C1 is supplied to the primary winding 6321, thereby generating the high voltage pulse in the secondary winding 6322. Since the period T from the storage of charges in the capacitor 6426 to the discharging of the charges can be calculated in advance, by driving the converting circuit 62 at the high frequency at a timing preceding any predetermined timing by the period T, the high voltage pulse can be reliably generated and applied at the predetermined timing.

On the other hand, when the converting circuit is driven at a driving frequency lower than the turned-on frequency, no high voltage pulse is generated since no charge is stored in the capacitor 6426. Accordingly, a case where the driving frequency of the converting circuit 62 is set to a frequency exceeding the turned-on frequency to generate the high voltage pulse and a case where the driving frequency of the converting circuit 62 is set to a frequency lower than the turned-on frequency to generate no high voltage pulse may be switched.

Accordingly, a configuration of a high voltage-resistant measure of the lighting device 6 and the controller 7 can be further simplified as compared to a configuration where the controller 7 is connected to the pulse generating circuit 63 by a control line and outputs a control signal to apply the high voltage pulse to the electrodes E. Accordingly, it is possible to set an application timing of the high voltage pulse with a simpler configuration.

A switching element to control a conduction state of a current from the capacitor C1 into the primary winding 6321 includes the DIAC 6427 and the thyristor 6428. Accordingly, when charges are discharged from the capacitor 6426 and the input voltage of the DIAC 6427 exceeds the threshold, the DIAC 6427 is quickly turned on, and further, the thyristor 6428 is turned on, thereby quickly supplying a current from the capacitor C1 to the primary winding 6321. Accordingly, it is possible to reduce a period from the discharging of charges of the capacitor 6426 to the generation of the high voltage pulse and to reliably apply the high voltage pulse at the above-mentioned predetermined timing.

Based on the application timing of the high voltage pulse (the high frequency driving timing), the controller 7 can switch between driving of the converting circuit 62 at the driving frequency exceeding the turned-on frequency and driving of the converting circuit 62 at the driving frequency lower than the turned-on frequency, thereby allowing an application of the high voltage pulse to the electrodes E at any predetermined timing. Since such a change of the driving frequency of the converting circuit 62 by the controller 7 can be made by changing a frequency at which the gate voltage is applied to the MOSFETs 621 and 622, the controller 7 can be relatively simply configured. Accordingly, it is possible to reliably set the application timing of the high voltage pulse with a simpler configuration.

Modifications of Embodiment

The invention is not limited to the above-described embodiment but various modifications, alterations, and improvements may be made within the spirit and scope of the invention. In particular, the number, arrangement, and configuration of circuit elements constituting the lighting device are not limited to the above embodiment.

Although the above embodiment employs the DIAC 6427 and the thyristor 6428 as third switching elements, the invention is not limited thereto. For example, a comparator may be employed instead of the DIAC 6427 and a FET may be employed instead of the thyristor 6428. That is, it may be sufficient if charges are discharged from the capacitor 6426 to quickly turn a turn-off state into a turn-on state and a large current can be caused to be flowed. In addition, the third switching elements may be in a single form.

Although it has been illustrated in the above embodiment that the turned-on frequency of the high pass filter 641 is 20 kHz and the driving frequencies of the converting circuit 62 in the high frequency period and the low frequency period are 50 kHz and 500 Hz, respectively, the invention is not limited thereto. That is, these values may be appropriately set.

Although it has been illustrated in the above embodiment that the converting circuit 62 is configured by a bridge circuit including the pair of MOSFETs 621 and the pair of MOSFETs 622, the invention is not limited thereto. For example, other transistors or FETs may be employed instead of the MOSFETs.

Although it has been illustrated in the above embodiment that the projector 1 includes three liquid crystal panels 442R, 442G, and 442B, the invention is not limited thereto. That is, the number of liquid crystal panels used for the projector may be equal to or less than 2, or equal to or more than 4.

Although it has been illustrated in the above embodiment that the image forming apparatus 4 has an L-like shape when viewed from the top, the image forming apparatus 4 is not limited thereto but may have, for example, a U-like shape when viewed from the top.

Although it has been illustrated in the above embodiment that the liquid crystal panels 442 are of a transmission type having a different light flux incidence plane and light flux emission plane, the liquid crystal panels 442 may be of a reflection type having the same light flux incidence plane and light flux emission plane.

Although it has been illustrated in the above embodiment that the projector 1 includes the liquid crystal panels 442 as an optical modulation device, other optical modulation devices may be employed as long as they are able to modulate an incident light flux to form an image based on image information. For example, optical modulation devices other than the liquid crystal panels, such as a device using micro mirrors, may be employed for the projector to which the principle of the invention is applied. In this case, the polarizing plates 443 and 445 at the light flux incidence and emission sides may be excluded.

Although it has been illustrated in the above embodiment that the projector 1 is of a front type where the projection direction of an image with respect to the projection-targeted plane is substantially the same as the observation direction of the image, the invention is not limited thereto. For example, the projector 1 may be a rear type where the projection direction is reverse to the observation direction.

Although it has been illustrated in the above embodiment that the illumination device 5 including the discharge lamp 511 and the lighting control device 52 is employed for the projector 1, the invention is not limited thereto. That is, the illumination device 5 may be configured by other devices such as a desk lamp.

The invention can be applied to lighting devices of discharge lamps such as a high pressure mercury lamp, particularly, a lighting device and a lighting control device of a discharge lamp which is employed for an illumination device and a projector.

The entire disclosure of Japanese Patent Application No: 2010-068296, filed Mar. 24, 2010 is expressly incorporated by reference herein.

What is claimed is:

1. A lighting device which supplies power to an electrode of a discharge lamp to light the discharge lamp, comprising:
   a converting circuit which includes a pair of first switching elements and a pair of second switching elements to which a direct current is input, and converts the direct current into an alternating current by switching between a state where one of the pair of first switching elements and the pair of second switching elements is turned on and a state where the other of the pair of first switching elements and the pair of second switching elements is turned off;

a pulse generating circuit which generates a high voltage pulse from the alternating current input from the converting circuit and applies the generated high voltage pulse to the electrode; and a trigger circuit which causes the pulse generating circuit to generate the high voltage pulse, wherein the pulse generating circuit includes a primary winding connected to the trigger circuit and a secondary winding connected to the converting circuit and generates the high voltage pulse by increasing a current input to the secondary winding based on a current input to the primary winding, and the trigger circuit includes a high pass filter which is connected at a middle point between the first switching elements and the second switching elements, flows the alternating current if the alternating current having a frequency which is equal to or higher than a predetermined frequency is input from the converting circuit, and interrupts the alternating current if the alternating current having a frequency which is lower than the predetermined frequency is input from the converting circuit;

a first capacitor which stores and discharges charges input via the high pass filter; and a third switching element which outputs an output current from a second capacitor connected in parallel to the converting circuit to the primary winding if an output voltage from the first capacitor exceeds a threshold.

2. The lighting device according to claim 1,
wherein the third switching element includes:
a DIAC connected to the first capacitor; and
a thyristor which includes a gate connected to an output terminal of the DIAC, a cathode connected to the first capacitor, and an anode connected to the primary winding.

3. A lighting control device comprising:
a lighting device according to claim 1; and
a controller which outputs a control signal to control the turned-on state and the turned-off state of the pair of first switching elements and the pair of second switching elements and drives the converting circuit based on the control signal.

4. A lighting control device comprising:
a lighting device according to claim 2; and
a controller which outputs a control signal to control the turned-on state and the turned-off state of the pair of first switching elements and the pair of second switching elements and drives the converting circuit based on the control signal.

5. The lighting control device according to claim 3,
wherein the controller switches a driving frequency of the converting circuit between a first frequency, which is equal to or higher than the predetermined frequency, and a second frequency, which is lower than the predetermined frequency, based on a timing at which the high voltage pulse is applied to the electrode by the pulse generating circuit.

6. The lighting control device according to claim 4,
wherein the controller switches a driving frequency of the converting circuit between a first frequency, which is equal to or higher than the predetermined frequency, and a second frequency, which is lower than the predetermined frequency, based on a timing at which the high voltage pulse is applied to the electrode by the pulse generating circuit.

7. An illumination device comprising:
a lighting control device according to claim 3; and
a discharge lamp which has an electrode and is lit by power supplied by the lighting control device.

8. An illumination device comprising:
a lighting control device according to claim 4; and
a discharge lamp which has an electrode and is lit by power supplied by the lighting control device.

9. An illumination device comprising:
a lighting control device according to claim 5; and
a discharge lamp which has an electrode and is lit by power supplied by the lighting control device.

10. An illumination device comprising:
a lighting control device according to claim 6; and
a discharge lamp which has an electrode and is lit by power supplied by the lighting control device.

11. A projector comprising:
an illumination device according to claim 7;
an optical modulation device which modulates a flux of light emitted from the illumination device; and
a projection optical device which projects the modulated flux of light.

12. A projector comprising:
an illumination device according to claim 8;
an optical modulation device which modulates a flux of light emitted from the illumination device; and
a projection optical device which projects the modulated flux of light.

13. A projector comprising:
an illumination device according to claim 9;
an optical modulation device which modulates a flux of light emitted from the illumination device; and
a projection optical device which projects the modulated flux of light.

14. A projector comprising:
an illumination device according to claim 10;
an optical modulation device which modulates a flux of light emitted from the illumination device; and
a projection optical device which projects the modulated flux of light.

* * * * *